(12) United States Patent
Sajassi et al.

(10) Patent No.: US 8,761,048 B2
(45) Date of Patent: Jun. 24, 2014

(54) MANAGING HIERARCHICAL ETHERNET SEGMENTS

(75) Inventors: Ali Sajassi, San Ramon, CA (US); Samer Salam, Vancouver (CA); Sami Boutros, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 137 days.

(21) Appl. No.: 13/471,676

(22) Filed: May 15, 2012

(65) Prior Publication Data

US 2013/0235876 A1 Sep. 12, 2013

Related U.S. Application Data

(60) Provisional application No. 61/609,059, filed on Mar. 9, 2012.

(51) Int. Cl.
*H04L 12/28* (2006.01)
*H04L 12/24* (2006.01)
*H04L 29/12* (2006.01)

(52) U.S. Cl.
CPC ........... *H04L 41/12* (2013.01); *H04L 29/12066* (2013.01); *H04L 61/1511* (2013.01)
USPC .......................................... 370/254; 709/245

(58) Field of Classification Search
CPC .............. H04L 41/12; H04L 29/12066; H04L 61/1511
USPC .............. 370/229, 230, 235, 236, 236.2, 255, 370/256, 401, 400, 352, 254; 709/220–222, 709/227–229, 242, 245
See application file for complete search history.

(56) References Cited

U.S. PATENT DOCUMENTS

| | | | |
|---|---|---|---|
| 7,633,889 B2 * | 12/2009 | Higashitaniguchi et al. . | 370/256 |
| 8,559,335 B2 | 10/2013 | Berman | |
| 8,565,230 B2 * | 10/2013 | Keesara et al. ............... | 370/389 |
| 2009/0274155 A1 * | 11/2009 | Nakash ..................... | 370/395.53 |
| 2010/0220739 A1 * | 9/2010 | Ishiguro ........................ | 370/401 |

* cited by examiner

*Primary Examiner* — Dady Chery
(74) *Attorney, Agent, or Firm* — P. Su

(57) ABSTRACT

In one embodiment, a method includes determining when a predetermined period of time has elapsed, and determining whether at least a first message has been obtained on a first port of a node during the predetermined period of time when it is determined that the predetermined period of time has elapsed. The method also includes identifying the first port as being connected to a single-homed site when it is determined that the at least first message has not been obtained on the first port during the predetermined period of time. The first port is identified as being connected to a multi-homed network, a multi-homed device, or a hierarchical Ethernet segment when it is determined that the at least first message has been obtained on the first port during the predetermined period of time.

28 Claims, 11 Drawing Sheets

US 8,761,048 B2

MANAGING HIERARCHICAL ETHERNET SEGMENTS

CROSS REFERENCE TO RELATED APPLICATION

This patent application claims priority of U.S. Provisional Parent Application No. 61/609,059, filed Mar. 9, 2012, entitled "Method and Apparatus for Managing Hierarchical Ethernet Segments," which is incorporated herein by reference in its entirety for all purposes.

TECHNICAL FIELD

The disclosure relates generally to network based services. More particularly, the disclosure relates to enabling a provider edge node to automatically sense the access topology associated with a multi-homed network that includes multi-homed customer edge nodes.

BACKGROUND

Ethernet Virtual Private Network (E-VPN) is a layer 2 virtual private network (VPN) technology, and is based on Multiprotocol Label Switching (MPLS). In general, an E-VPN network includes customer edge nodes (CEs) such as hosts, routers, and/or switches that form the edge of a customer system connected to an MPLS infrastructure. Ethernet Provider Backbone Bridging (PBB) utilizes Media Access Control (MAC) tunneling in Ethernet networks and in Virtual Private LAN Services (VPLS) networks. Combining PBB with E-VPN creates a PBB-EVPN that results in a reduction of a number of Border Gateway Protocol (BGP) MAC advertisement routes.

E-VPN and PBB-EVPN both support device multi-homing, as well as network multi-homing. When device multi-homing is supported, an all-active redundancy model with flow-based load-balancing may be supported. When network multi-homing is supported, an all-active redundancy model with load-balancing based on a virtual local area network (VLAN) may be supported. With network multi-homing, the ability to accommodate increased bandwidth requirements, the ability to accommodate different access topologies, and the ability to provide efficient load-balancing is critical to ensure that an overall network may perform to desired levels.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

According to one aspect, a method includes determining when a predetermined period of time has elapsed, and determining whether at least a first message has been obtained on a first port of a node during the predetermined period of time when it is determined that the predetermined period of time has elapsed. The method also includes identifying the first port as being connected to a single-homed site when it is determined that the at least first message has not been obtained on the first port during the predetermined period of time. The first port is identified as being connected to a multi-homed network, a multi-homed device, or a hierarchical Ethernet segment when it is determined that the at least first message has been obtained on the first port during the predetermined period of time. The hierarchical Ethernet segment includes a first segment and a second segment. The second segment corresponds to an access network.

Description

Ethernet Virtual Private Network (E-VPN) and Ethernet Provider backbone Bridging EVPN (PBB-EVPN) both generally support single-homed devices, single-homed networks, multi-homed devices and multi-homed networks. With respect to E-VPNs and PBB-EVPNs, customer edges (CEs), e.g., CE nodes and/or CE devices, may be multi-homed devices that are within a multi-homed network In one embodiment, within a multi-homed network, the topology of an access network that includes at least one CE to which a provider edge (PE) is effectively connected may be automatically sensed by the PE. Additionally, virtual local area networks (VLANs) which carry "heavy" VLAN, e.g., video traffic, are accommodated, and granular load-balancing at PEs is accommodated. As such, E-VPN networks and PBB-EVPN networks may perform efficiently.

An access network that runs a Multiple Spanning Tree (MST) protocol may be multi-homed to one or more PEs, and each CE that is a part of the access network may be multi-homed to the one or more PEs via a Link Aggregation Group (LAG), e.g., a multi-chassis LAG. A LAG generally allows all links that are part of the LAG to effectively be treated as a single bridge port and, therefore addresses using a single MAC address. As each LAG represents a child Ethernet segment within a parent segment corresponding to the access network, e.g., an MST region, a hierarchical Ethernet segment (ES) may be created that includes the child Ethernet segment and the parent segment. By identifying a hierarchical Ethernet segment in messages and/or advertisements sent within an overall network, a receiving PE may automatically detect a hierarchical segment relationship and, thus, determine the topology of the access network.

Figure 1A:
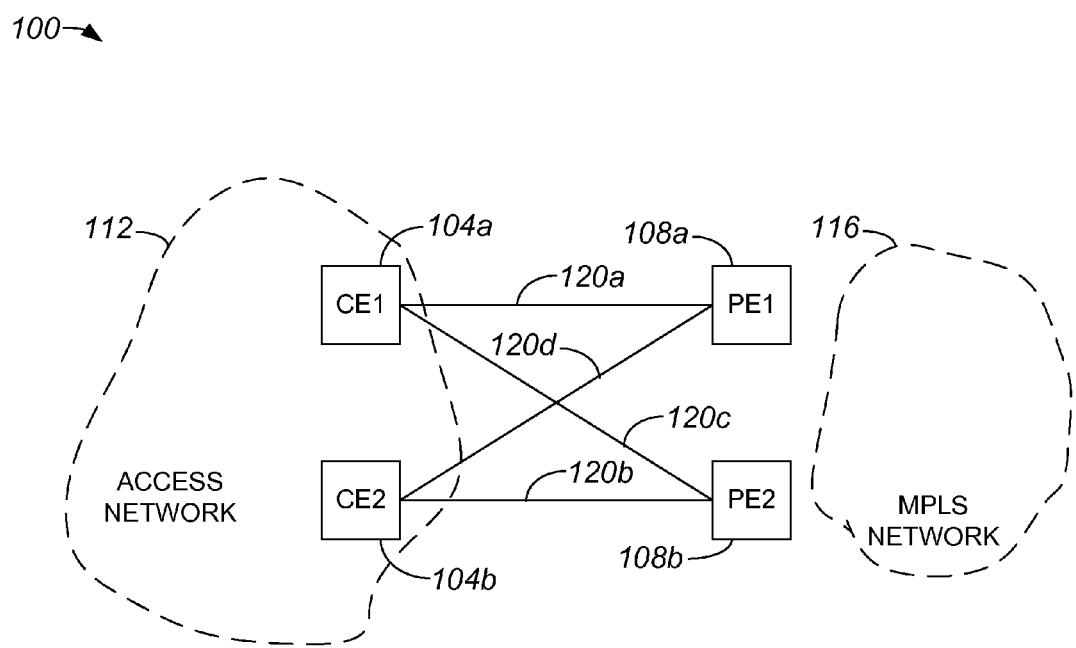
FIG. 1A is a diagrammatic representation of an overall network in accordance with an embodiment.

Referring initially to FIG. 1A, an overall network will be described in accordance with an embodiment. An overall network 100 includes an access network 112, as for example a multi-homed network running MST, and a Multiprotocol Label Switching (MPLS) or Internet Protocol (IP) network 116. MPLS network 116 has layer 2 VPN connectivity, e.g., E-VPN or PBB-EVPN connectivity.

MPLS network 116 is behind a PE 108a and a PE 108b, which may both be nodes such as routers and/or switches. Access network 112 is multi-homed to PE 108a, 108b via links 120a-d. Each CE 104a, 104b in access network 112 is multi-homed to each PE 108a, 108b. In the described embodiment, CEs 104a, 104b are multi-homed devices.

Figure 1B:
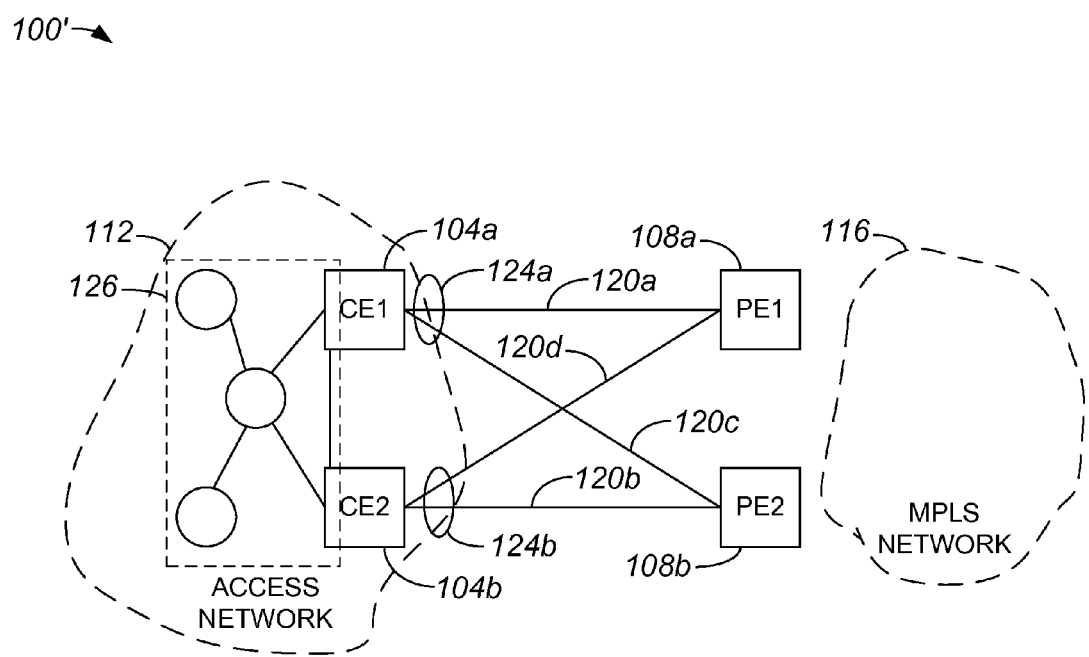
FIG. 1B is a diagrammatic representation of an overall network, e.g., overall network 100 of FIG. 1A, in which link aggregation groups (LAGs) and Ethernet segments are configured in accordance with an embodiment.

FIG. 1B is a diagrammatic representation of an overall network, e.g., overall network 100 of FIG. 1A, in which LAGs and Ethernet segments are configured in accordance with an embodiment. Within an overall network 100' that includes access network 112 and MPLS network 116, a LAG 124a that includes links 120a, 120c may be identified using an Ethernet segment identifier (ESI) with a value of "ESI1," and a LAG 124b that includes links 120b, 120d may be identified using an ESI with a value of "ESI2." Within access network 112 which, as previously mentioned, may be multi-homed. An MST region 126 of links and nodes has an ESI with a value of "ESI3."

Each LAG 124a, 124b effectively represents a "child" Ethernet segment within a "parent" segment corresponding to MST region 126. Thus, a hierarchical Ethernet segment includes the parent segment corresponding to MST region 126, e.g., ESI3, and multiple associated child segments, e.g., ESI1 and ESI2.

A hierarchical relationship between Ethernet segments may be conveyed by defining a Border Gateway Protocol (BGP) route attribute. Such a BGP route attribute, which will be discussed below with respect to FIG. 4, generally encodes the ESI of any segment correlated with an advertised route representing another segment. By way of example, with respect to FIG. 1B, if CE 104a and CE 104b each hash MST Bridge Protocol Data Units (BPDUs) to PE 108a, then PE 108a may advertise three Ethernet segment routes. The three Ethernet segment routes advertised by PE 108a may be a first route with an ESI value set to ESI1 as well as a defined BGP route attribute identifying a correlated segment as ESI3, a second route with an ESI value set to ESI2 as well as a defined BGP route attribute identifying a correlated segment as ESI3, and a third route with an ESI value set to ESI3 as well as a defined BGP route attribute identifying correlated segments as ESI1 and ESI2. While PE 108a may advertise three Ethernet segment routes, PE 108b may advertise a first route with an ESI value set to ESI1, and a second route with an ESI value set to ESI2.

Figure 2:
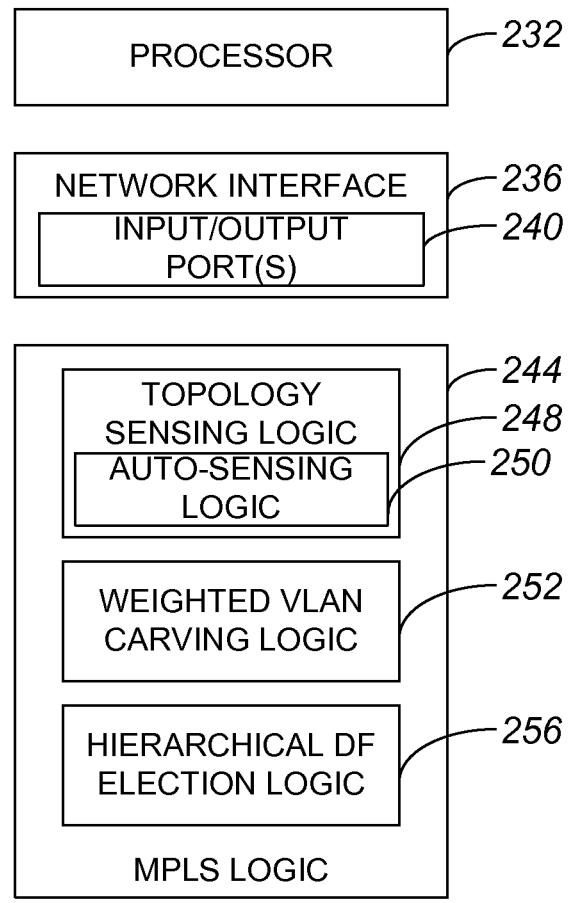
FIG. 2 is a block diagram representation of a provider edge node in accordance with an embodiment.
Figure 3A:
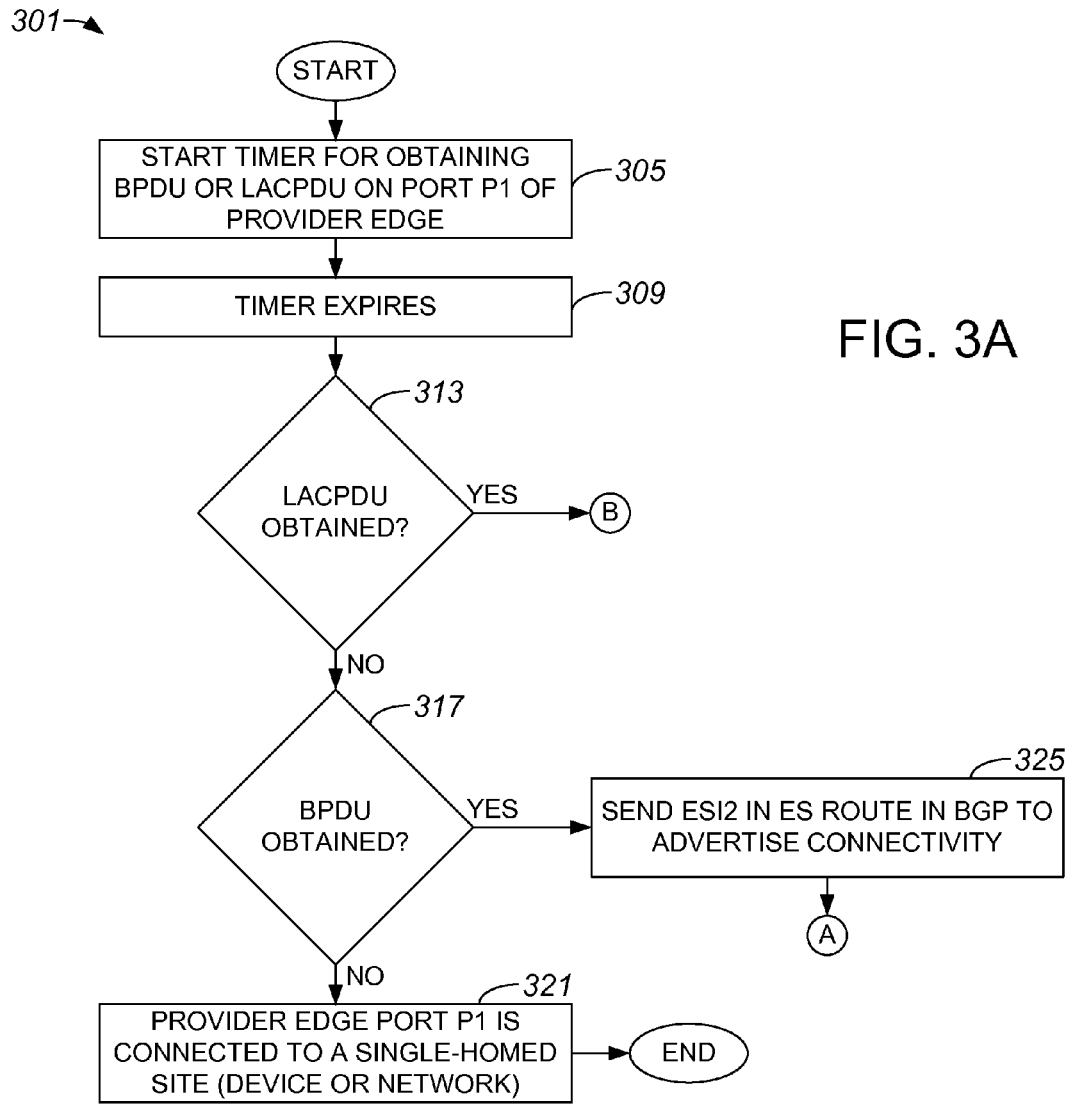
FIGS. 3A-F are a process flow diagram which illustrates the operating of an auto-sensing algorithm in accordance with an embodiment.
Figure 3B:
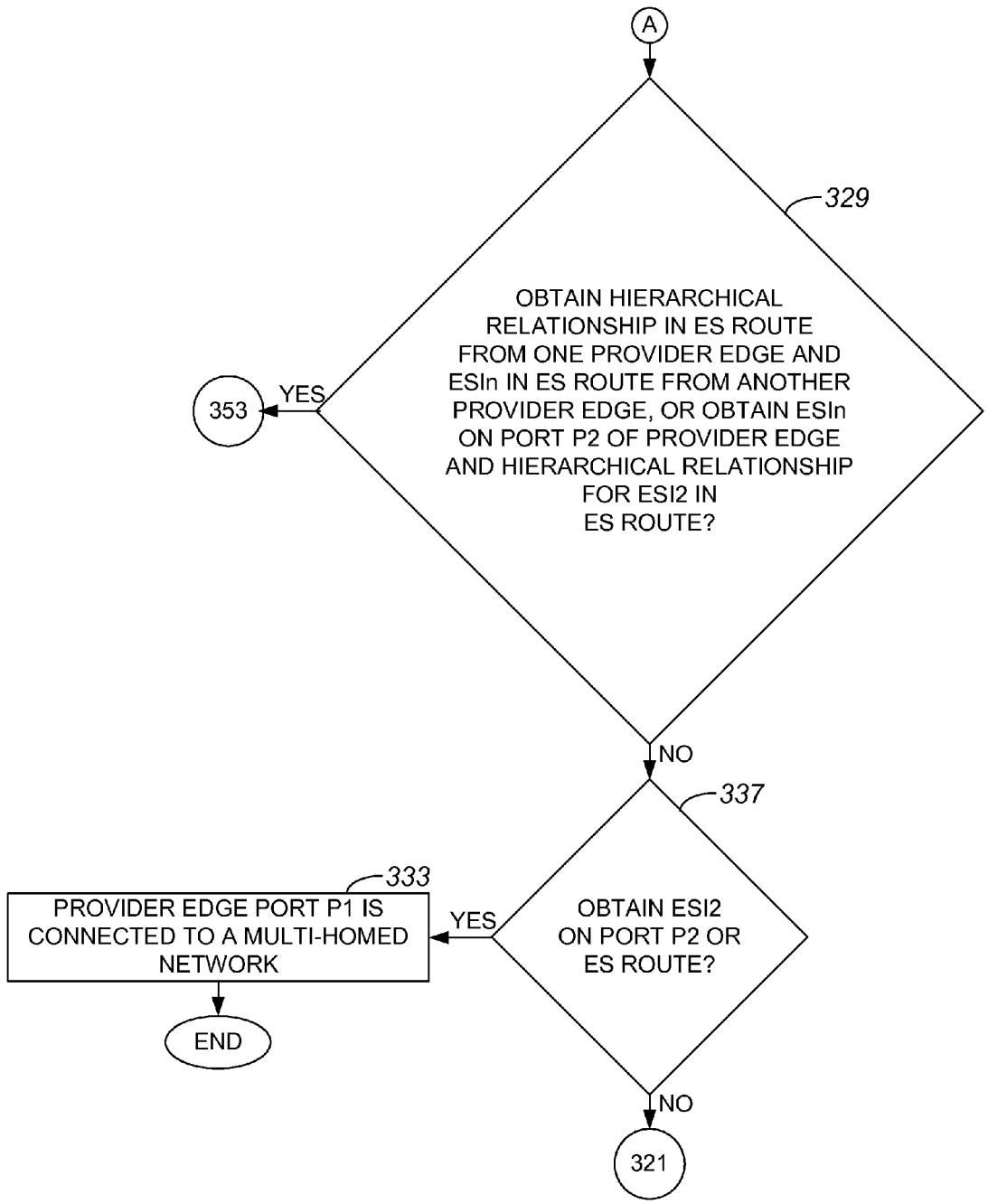
Figure 3C:
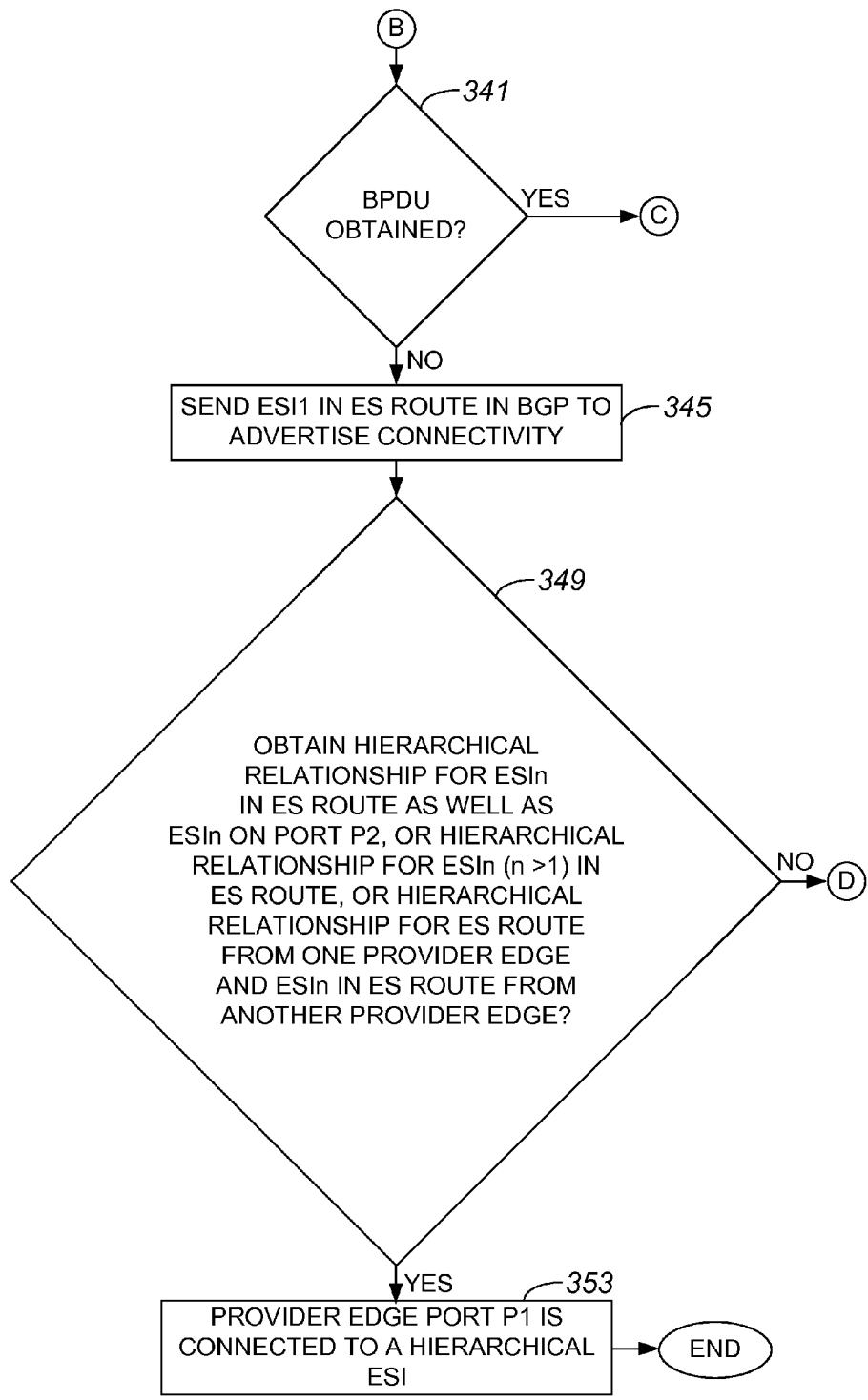
Figure 3D:
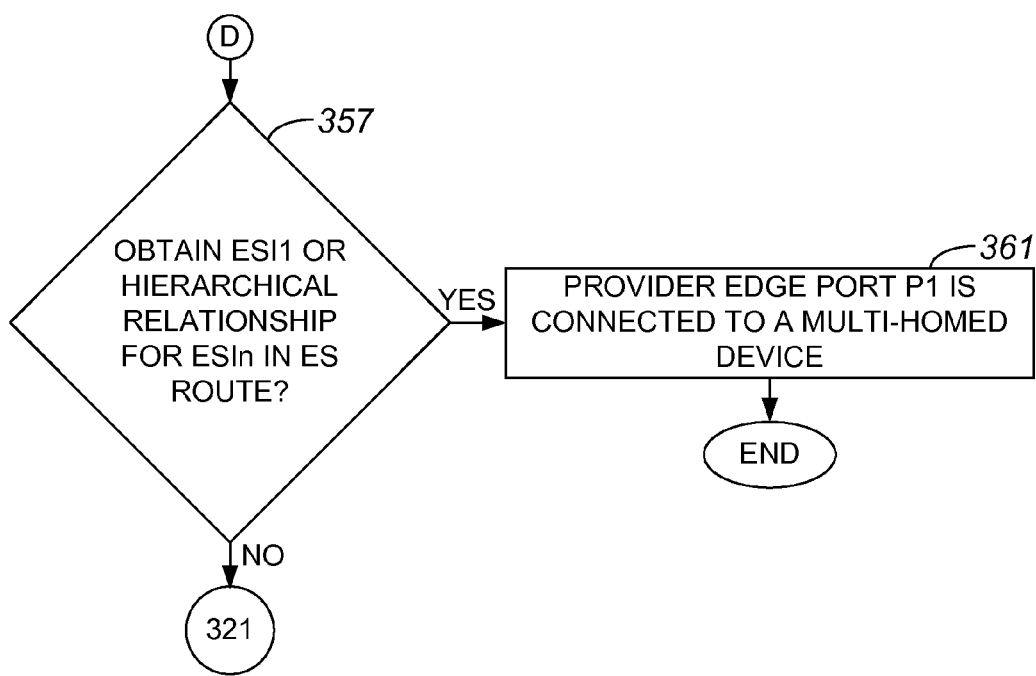
Figure 3E:
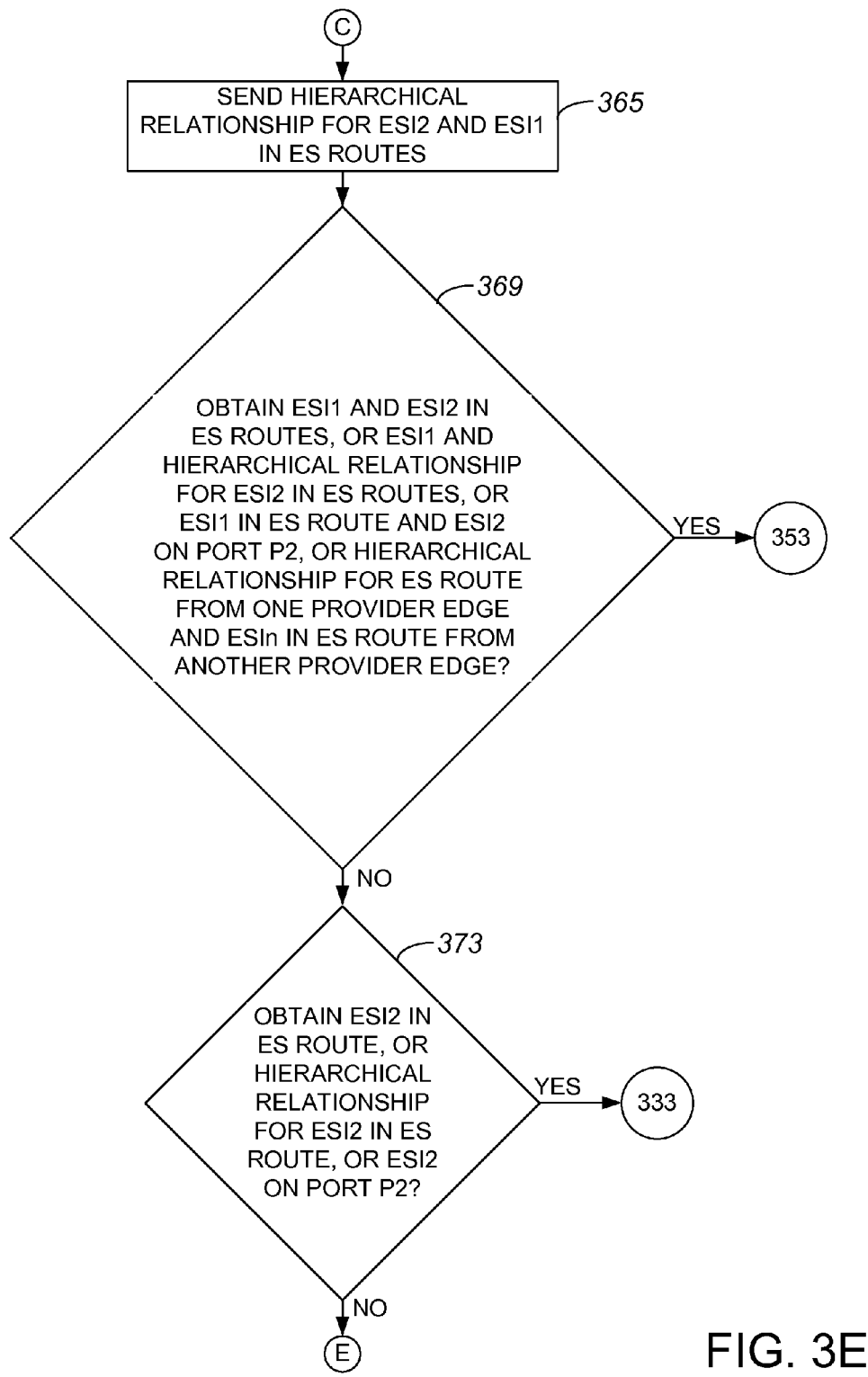
Figure 3F:
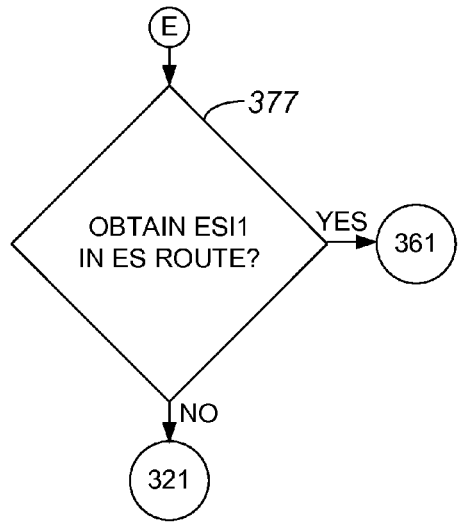

FIG. 2 is a block diagram representation of a PE in accordance with an embodiment. A PE 208 may be a router and/or a switch. It should be appreciated, however, that PE 208 is not limited to being a router and/or a switch. PE 208 includes a processor 232, a network interface 236, and MPLS logic 244. Processor 232 is generally arranged to execute logic, e.g., MPLS logic 244, associated with PE 208.

Network interface 236 is configured to allow PE 208 to communicate with other nodes (not shown), as for example CEs, across a network. Typically, network interface 236 includes at least one input/output (I/O) port 240 that is configured to provide, e.g., to send, and to obtain, e.g., to receive, data such as messages through a network.

MPLS logic 244 is generally arranged to support different access technologies, and assigns labels to data packets that may be used to determine how to forward the data packets. That is, MPLS logic 244 is configured to enable PE 208 to support MPLS. In the described embodiment, MPLS logic 244 is further configured to include topology sensing logic 248, weighted VLAN carving logic 252, and hierarchical designated forwarder (DF) election logic 256.

Topology sensing logic 248 is generally arranged to detect the topology of a network to which PE 208 is connected. For example, topology sensing logic 248 may determine whether an I/O port 240, is effectively connected to a single-home network, a single-home device, a multi-homed network, a multi-homed device, or a hierarchical Ethernet segment. Auto-sensing logic 250 may facilitate a determination of the topology of the network to which PE 208 is connected.

Weighted VLAN carving logic 252 is generally arranged to provide, and to adjust, weights to I/O ports 240 when performing VLAN carving, e.g., when allocating VLANs. Weighted VLAN carving logic 252 is also arranged to allow PE 208 to determine how to carve up, or otherwise divide, VLANs among I/O ports 240.

Hierarchical DF election logic 256 causes a designated forwarder to be identified, e.g., through cooperation with substantially all PEs associated with a given child segment of a network, for use in forwarding multi-destination traffic towards a particular segment in the network. Hierarchical DF election logic 256 identifies a designated forwarder and, as a result, essentially prevents forwarding loops and/or traffic black-holing from occurring within a network.

As previously mentioned, a PE may detect the topology of a network, e.g., an access network, to which the PE is substantially connected. Auto-sensing logic, e.g., auto-sensing logic 250 of FIG. 2, may allow a PE to automatically sense the topology of a network. With reference to FIGS. 3A-F, the operation of an auto-sensing algorithm that executes on a PE will be described in accordance with an embodiment. It should be understood that an autosensing algorithm may be executed with respect to each port or interface associated with a PE. A method 301 of substantially automatically identifying the topology of a network to which a port of a PE is effectively in communication begins at step 305 in which the PE starts a timer for obtaining a BPDU or a Link Aggregation Control Protocol Data Unit (LACPDU) on a port, i.e., port P1. As will be appreciated by those skilled in the art, a BPDU may be sent between nodes, e.g., from a CE to a PE, to determine a best path between the nodes in a Spanning Tree Protocol (STP) environment. An LACPDU is generally a frame that is sent by a node, e.g., a CE, associated with a LACP environment, and may be used to facilitate the creation of a link aggregation group, e.g., a logical link, between the node and another node, e.g., a PE.

In step 309, the timer expires. It should be appreciated that the length of time that a timer is running may vary widely depending upon factors including, but not limited to including, system requirements. That is, the amount of time that elapses between the starting of the timer and the expiration of the timer may vary widely. After the timer expires, a determination is made in step 313 as to whether an LACPDU was obtained prior to the expiration of the timer. If the determination is that an LACPDU was not obtained prior to the expiration of the timer, then a determination is made in step 317 regarding whether a BPDU was obtained prior to the expiration of the timer.

When it is determined in step 317 that a BPDU was not obtained before the timer expired, then port P1 of the PE is identified as being connected to a single-homed site in step 321. The single-homed site may either be a single-homed device or a single-homed network. Once port P1 of the PE is identified as being connected to a single-homed site, the method of substantially automatically identifying the topology of a network to which a port of the PE is effectively in communication is completed.

Alternatively, if it is determined in step 317 that a BPDU has been obtained, the indication is that a particular CE is part of an MST region. In the described embodiment, the implication is that the BPDU has a root bridge identifier (ID) of ESI2, and that port P1 is connected to an Ethernet segment that has an ESI with a value of ESI2. As such, in the described embodiment, an ESI with a value of ESI2 is sent in a BGP Ethernet segment route, or an ES route in BGP, to advertise connectivity to the Ethernet segment.

From step 325, process flow proceeds to step 329 in which it is determined whether a hierarchical relationship specifying ESI2 and "ESIn" is obtained in an ES route from one PE while an ESI with a value of ESIn is obtained from another PE, or whether an ESI value of ESIn is obtained on port P2 of the PE while a hierarchical relationship associated with ESI2 and ESIn is obtained in an ES route. It should be appreciated that ES routes are obtained from other PEs, i.e., PEs other than the PE on which port P1 is located. The hierarchical relationship between ESI2 and ESIn may be expressed in the ES route advertised for ESI2 by, for example, embedding a new BGP route attribute which encodes the list of ESIs, including ESIn, that are in a hierarchical relationship with ESI2.

If the determination in step 329 is affirmative, then port P1 is determined to be connected to a hierarchical ESI in step 353. Once port P1 is effectively sensed as being connected to a hierarchical ESI, the method of substantially automatically identifying the topology of a network to which a port of a PE is effectively in communication is completed.

Alternatively, if the determination in step 329 is not affirmative, then process flow moves to step 337 in which it is determined whether an Ethernet segment with an ESI value of ESI2 was obtained on port P2 of the PE or whether an ESI value of ESI2 was obtained in an ES route. That is, it is determined whether another local port on the PE received a BPDU with an ESI value of ESI2 or whether an ES route with an ESI value of ESI2 was received from another PE. If the determination in step 337 is that a BPDU with an ESI value of ESI2 was not obtained on port P2 of the PE or that an ESI of value ESI2 was not received in an ES route, then port P1 of the PE is identified in step 321 as being connected to a single-homed site. On the other hand, if the determination in step 337 is that a BPDU with an ESI value of ESI2 was obtained on port P2 of the PE or that an ESI value of ESI2 was obtained in an ES route, then port P1 of the PE is identified in step 333 as being connected to a multi-homed network. Once port P1 is effectively identified as being connected to a multi-homed network, the method of substantially automatically identifying the topology of a network to which a port of a PE is effectively in communication is completed.

Returning to step 313 and a determination of whether an LACPDU has been obtained on port P1 of the PE, if the determination is that an LACPDU has been obtained, the indication is that port P1 is effectively connected to an Ethernet segment with an ESI value of ESI1. As such, process flow proceeds to step 341 in which it is determined if a BPDU has also been obtained on port P1. If the determination in step 341 is that a BPDU has been obtained, the implication is that port P1 is also effectively connected to an Ethernet segment with an ESI value of ESI2. Accordingly, a hierarchical relationship for ESI2 and ESI1 is sent in ES routes in step 365. A determination is then made in step 369 as to whether an ESI with a value of ESI1 and an ESI with a value of ESI2 are obtained in ES routes, whether an ESI value of ESI1 as well as a hierarchical relationship for ESI2 is obtained in ES routes, whether an ESI value of ESI1 is obtained in an ES route and an ESI value of ESI2 is obtained on port P2, or whether a hierarchical relationship associated with ESI2 and ESIn sis obtained in an ES route from one PE while an ESI value of ESIn is obtained in an ES route from another provider edge. It should be appreciated that with respect to the determination in step 369, an affirmative determination may involve more than one condition being satisfied or otherwise met.

If the determination in step 369 is that any of the conditions has occurred, then process flow moves to step 353 in which port P1 is identified as being connected to a hierarchical ESI. Upon identifying that port P1 is connected to a hierarchical ESI, the method of substantially automatically identifying the topology of a network to which a port of a PE is effectively in communication is completed.

Alternatively, if the determination in step 369 is that none of the conditions has occurred, then a determination is made in step 373 as to whether an ESI value of ESI2 is obtained in an ES route, or whether a hierarchical relationship associated with ESI2 is obtained in an ES route, or whether a BPDU with an ESI value of ESI2 is obtained on port P2. If it is determined in step 373 that any of the conditions has occurred, then process flow moves to step 333 in which port P1 is identified as being connected to a multi-homed network. If, however, it is determined in step 373 that none of the conditions has occurred, then a determination is made as to whether an ESI value of ESI1 is obtained in an ES route in step 377. Such an ES route may be obtained from a remote PE.

If the determination in step 377 is that an ESI value of ESI1 has been obtained in an ES route, then port P1 is identified as being connected to a multi-homed device in step 361, and the method of substantially automatically identifying the topology of a network to which a port of a PE is effectively in communication is completed. Alternatively, if it is determined in step 377 that an ESI value of ESI1 is not obtained in an ES route, then port P1 is identified as being connected to a single-homed site in step 321.

Returning to step 341 and a determination of whether a BPDU has been obtained on port P1, if it is determined that a BPDU has not been obtained, then an ESI value of EST1 is sent in an ES route in BGP to advertise connectivity to the Ethernet segment in step 345. After the ES route is sent, it is determined in step 349 whether a hierarchical relationship for ESIn with ESI1 has been obtained in an ES route and an ESI value of ESIn has been obtained on port P2, whether a hierarchical relationship for ESIn with ESI1 has been obtained in an ES route and an advertising PE is declaring that more than one port is connected to ESIn, or whether a hierarchical relationship for ESIn with ESI1 has been obtained in an ES route from one PE and an ESI value of ESIn has been obtained in an ES route from another PE.

Port P1 is identified, in step 353, as being connected to a hierarchical ESI if the determination in step 349 is that any of the conditions is true. On the other hand, if the determination in step 349 is that none of the conditions is true, then process flow moves to step 357 in which a determination is made as to whether an ESI value of ESI1 has been obtained in an ES route, or whether a hierarchical relationship for ESIn with ESI1 has been obtained in an ES route. If it is determined that an ESI value of ESI1 has not been obtained in an ES route, and that a hierarchical relationship for ESIn with ESI1 has also not been obtained in an ES route, then, in step 321, port P1 is identified as being connected to a single-homed site. If, however, it is determined in step 357 that an ESI value of ESI1 has been obtained, or that a hierarchical relationship associated with ESIn has been obtained, then port P1 is identified as being connected to a multi-homed device in step 361.

Figure 4:
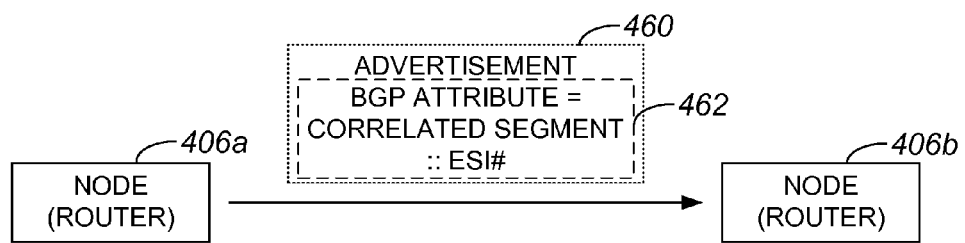
FIG. 4 is a diagrammatic representation of an advertisement which includes a correlated segment attribute in accordance with an embodiment.

As previously mentioned, an ESI identifier may be provided, e.g., encoded, in a message or a route advertisement, as a BGP attribute. In one embodiment, such a BGP attribute may be a correlated segment attribute. FIG. 4 is a diagrammatic representation of an advertisement which includes a correlated segment attribute in accordance with an embodiment. A node 406a may send an advertisement 460 to a node 406b. In one embodiment, node 406a may be a PE that advertises an Ethernet segment route in an advertisement 460. Advertisement 460 includes at least one BGP attribute 462 that is a correlated segment attribute. As shown, BGP attribute 462 encodes an ESI value or values of at least one segment correlated to a route advertised in advertisement 460.

By effectively identifying correlated segments in advertisements such as advertisement 460, a PE may convey a hierarchical relationship between segments to another PE. Upon obtaining or otherwise receiving an advertisement that identifies a correlated segment, a PE may essentially detect a hierarchical relationship between segments.

VLAN carving generally allows different DFs for different VLANs on an Ethernet segment to be elected for purposes of load-balancing. In general, VLAN carving involves the exchange of information among nodes connected to an Ethernet segment in order to determine how VLANs will be distributed among the nodes.

VLAN carving may be implemented with respect to a multi-homed device, a multi-homed network, and a hierarchical Ethernet segment. When VLAN carving is implemented with respect to a multi-homed network, VLANs may either be divided among substantially all available ports or divided among nodes, e.g., PEs. When VLANs are divided among substantially all available ports, port failures and node failures may be handled globally. When VLANs are divided among nodes, port failures may be handled locally on the nodes while node failures may be handled globally.

Figure 5:
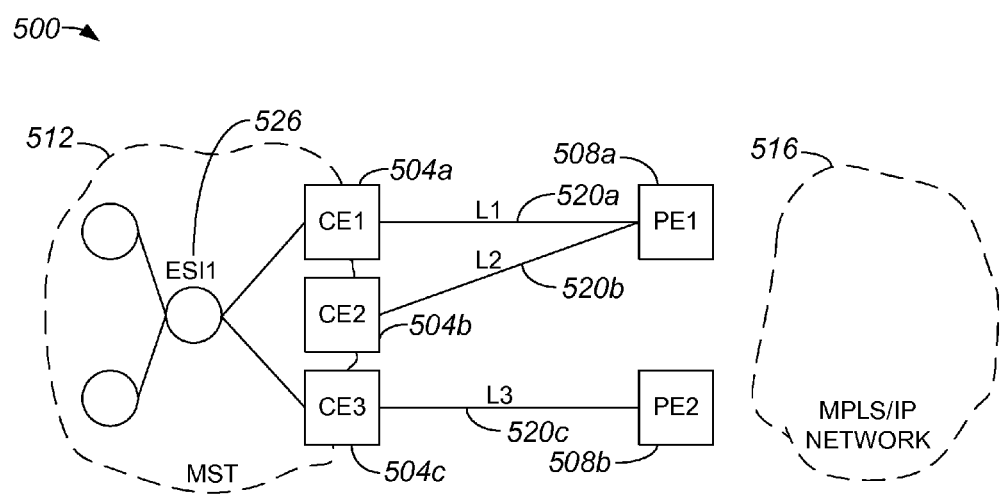
FIG. 5 is a diagrammatic representation of an overall network in which weighted virtual local area network (VLAN) carving may be implemented in accordance with an embodiment.

Referring next to FIG. 5, an overall network in which weighted VLAN carving may be implemented will be described in accordance with an embodiment. An overall network 500 includes an access network 512 and an MPLS or IP network 516. Access network 512 includes CEs 504a-c, while PEs 508a, 508b may access MPLS or IP network 516. A link L1 520a connects CE 504a to PE 508a, a link L2 520b connects CE 504b to PE 508a, and a link L3 520c connects CE 504c to PE 508b. An Ethernet segment that corresponds to an MST region is identified as ESI1 526.

Within overall network 500, weighted VLAN carving generally includes assigning a weight to each PE 508a, 508b. The number of local ports per segment on a PE 508a, 508b may be the weight for that PE 508a, 508b. By way of example, for ESI1 526, PE 508a has a weight of two, and PE 508b has a weight of one. In one embodiment, weights may be communicated in a message or an advertisement as a DF attribute, i.e., a DF attribute of an ES route.

Each PE 508a, 508b may construct a weighted list of PE IP addresses, and then assign a weighted ordinal for each entry in the list. The weighted list of PE IP addresses may be arranged in ascending order, and the weighted ordinal may start at zero. In the described embodiment, a weighted list may include listing PE 508a with a weighted ordinal of zero, listing PE 508a with a weighted ordinal of one, and listing PE2 with a weighted ordinal of two. As PE 508a has one entry in the list corresponding to link L1 520a and another entry in the list corresponding to link L2 520b, PE 508a is effectively listed twice in a weighted list. In general, each PE 508a, 508b has one or more weighted ordinals, and the number of ordinals equals the weight associated with a particular PE IP address.

Both PEs 508a, 508b calculate a total number of links "T" for Ethernet segment EST1 526 on all PEs 508a, 508b. In the described embodiment, the total number of links associated with Ethernet segment EST1 526 is three, i.e., T has a value of 3. A DF for a particular VLAN may be selected based on a weighted ordinal associated with a PE 508a, 508b. Substantially any suitable algorithm may be used to determine a weighted ordinal. By way of example, a PE 508a, 508b with a weighted ordinal "j" may be a DF for a VLAN "V" when the following is true:

$$V \bmod T = j.$$

The hash of the modulo may indicate which PE 508a, 508b is the designated forwarder for which VLAN. In general, a PE 508a, 508b with a higher weight, or more links 520a-c connected to Ethernet segment EST1 526 may be allotted more VLANs. Each PE 508a, 508b may locally determine how to carve up VLANs among its ports, e.g., PE 508a may determine how to carve up VLANs allocated to PE 508a among the ports of PE 508a. The methods used by each PE 508a, 508b to carve up VLANs among its ports may vary widely. In one embodiment, an ordered list of ports may be constructed, and a modulo has may be run to distribute the VLANs among the ports of a PE 508a, 508b.

When a link 520a-c fails and/or a port of a PE 508a, 508b fails, PEs 508a, 508b may adjust weights advertised on an Ethernet Segment route, and may carve up VLANs again. Additionally, when there are any failures associated with a CE 504a-c, VLANs may be carved up again. That is, in the event of a failure associated with an Ethernet Segment ESI1 526, a re-carving process may be implemented by PEs 508a, 508b. Further, when a PE 508a, 508b is decommissioned, or when a new PE (not shown is commissioned), a re-carving process may be implemented to allocate VLANs among PEs 508a, 508b and the new PE.

Prior to a local re-carving process, a PE 508a, 508b may send an ES route update. Such an update may specify, but is not limited to specifying, that an ES route has been updated or withdrawn. In one embodiment, in order to account for a BGP propagation delay, a timer may be implemented to delay a local re-carving process on a PE until after an ES route update is likely to be processed by the PEs that receive the ES route update. Upon receiving an ES route update, the receiving PEs may implement a re-carving process. By way of example, when PE 508a sends an ES route update within network 500, PE 508b may implement a local re-carving process once the ES route update is received.

It should be appreciated that when a VLAN moves, e.g., when a VLAN allocated to PE 508a is reallocated to PE 508b as a result of re-carving, the PE 508b generally sends a topology change notification message, as for example a multiple VLAN registration protocol (MVRP) new declaration, towards access network 512 to substantially induce MAC address flushing. That is, if a VLAN is re-allocated to a new PE, the new PE typically ensures that the change in the allocation is effectively understood within access network 512.

Figure 6:
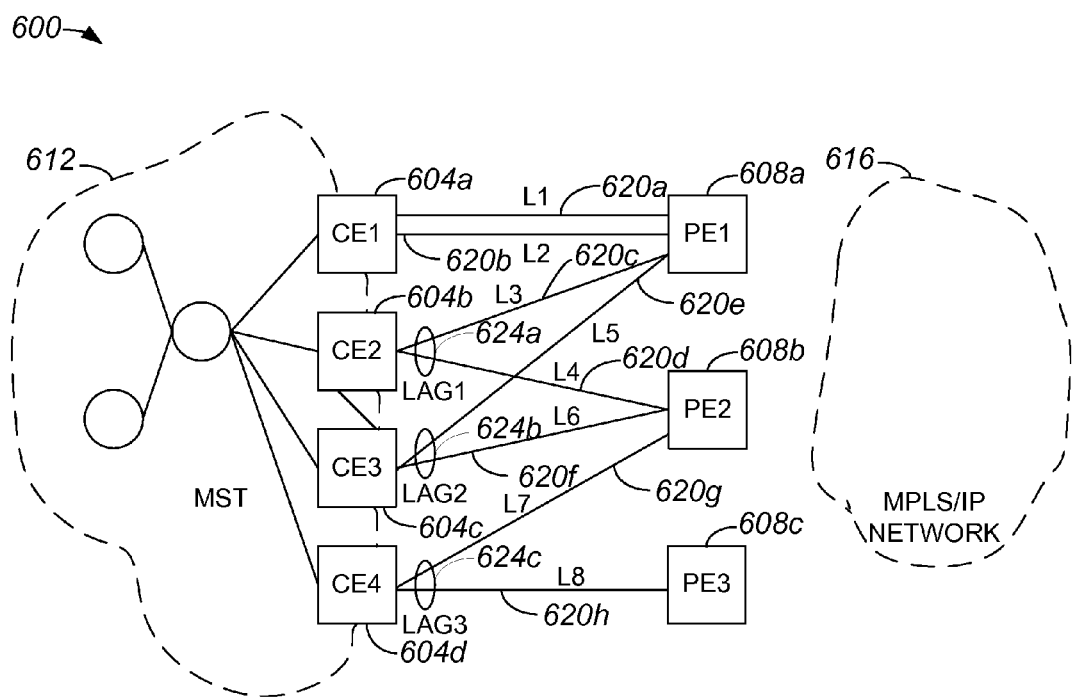
FIG. 6 is a diagrammatic representation of an overall network in which a hierarchical designated forwarder (DF) election may be implemented in accordance with an embodiment.

To prevent forwarding loops associated with processing interfaces connected to a hierarchical Ethernet segment as if they were part of a multi-homed device and to traffic blackholing associated with processing interfaces connected to a hierarchical Ethernet segment as if they were a part of a multi-homed network, a hierarchical DF election procedure may be used. With reference to FIG. 6, an overall network in which a hierarchical DF election may be implemented will be described in accordance with an embodiment. An overall network 600 includes an access network 612 that has an MST region, and also includes CEs 604a-d. Overall network 600 also includes an MPLS or IP network 616, and PEs 608a-c that may provide access to MPLS or IP network 616.

CE1 604a is in communication with PE1 608a through a link L1 620a and a link L2 620b. CE2 604b is in communication with PE1 608a through a link L3 620c, and with PE2 608b through a link L4 620d. Link L3 620c and link L4l 620d form a LAG 624a. CE3 604c is in communication with PE1 608a through a link L5 620e, and with PE2 608b through a link L6 620f. Link L5 620e and link L6 620f form a LAG 624b. CE4 604d is in communication with PE2 608b through a link L7 620g, and with PE3 608c through a link L8 620h. Link L7 620g and link L8 620h form a LAG 624c.

A hierarchical DF election may generally be formed using two processes. In a first process, substantially all PEs associated with a parent segment may determine which VLANs are assigned to child segments, and which VLANs are assigned to each PE for use on links that are not associated with child segments. For example, PEs associated with a multi-homed network may effectively agree on which VLANs are assigned to segments of a multi-homed domain. In a second process, substantially all PEs associated with a given child segment may agree on a DF for forwarding multi-destination traffic towards a segment for each VLAN.

With respect to a first process associated with a hierarchical DF election, each PE 608a-c as shown in FIG. 6 may import ES routes for substantially all child segments. The ES routes may identify correlated segments in a BGP attribute, in one embodiment. Then, an ordered list of PEs 608a-c which may be created as a part of a weighted VLAN carving process is effectively extended to include "pseudo-PEs" which represent child segments. LAGs 624a-c may each be identified as a pseudo-PE, e.g., LAG 624 may be identified as "pseudo-PE12" while LAG 624b may be identified as "pseudo-PE23."

A weighted VLAN carving may be performed on an ordered list of PEs 608a-c that has been extended to include pseudo-PEs. The weighted VLAN carving that is performed may involve adjusting the weight of each PE 608a-c and each pseudo-PE prior to carving. In one embodiment, adjusting the weight of each PE 608a-c and pseudo-PE may include subtracting from the number of links in associated child segments from the weight of every PE 608a-c.

VLANs assigned to a pseudo-PE are associated with a multi-chassis (MC) LAG on substantially all PEs that connect to the MC-LAGs. In one embodiment, LAGs 624a-c may all be MC-LAGs. An MC-LAG enables two or more PEs to share a common LAG endpoint. VLANs assigned to a PE are associated with non MC-LAG ports on the PE. DF filtering for each VLAN may be performed by unblocking unicast traffic in both directions, i.e., from network 612 to network 616 and from network 616 to network 612, by unblocking multi-destination traffic in a direction from network 612 to network 616 for MC-LAGs, and by unblocking multi-destination traffic from network 612 to network 616 and from network 616 to network 612 for non MC-LAGs. It should be appreciated that when PEs initially start, e.g., come online, multi-destination traffic between network 612 and network 616 is typically blocked.

With respect to a second process associated with a hierarchical DF election, substantially all PEs connected to a particular MC-LAG may perform a weighted VLAN carving to allocate VLANs. During the course of performing a weighted VLAN carving, a weighted list of PE IP address may be constructed, and for every VLAN assigned to a pseudo-PE that is associated with an MC-LAG on PEs connecting to the MC-LAG, a process is performed to determine which PE is the DF for each VLAN. The process performed to identify a PE that is a DF for a particular VLAN may be a modulo hashing function. The DF identified for every VLAN may unblock multi-destination traffic in a direction from network 616 to network 612 over an associated MC-LAG.

Although only a few embodiments have been described in this disclosure, it should be understood that the disclosure may be embodied in many other specific forms without departing from the spirit or the scope of the present disclosure. By way of example, the use of an automatic sensing algorithm, weighted VLAN carving, and hierarchical DF election has generally been described as being suitable with respect to E-VPN and/or PBB-EVPN. However, the use of an automatic sensing algorithm, weighted VLAN carving, and hierarchical DF election is not limited to being used with respect to E-VPN and/or PBB-EVPN.

When a PE has more than one port on a given Ethernet segment, if there are port failures involving less than all of the ports, then the PE may send an ES route with a most current weight associated with the PE. If, however, substantially all ports on a PE fail, then the PE may withdraw an associated ES route.

The networks described above may vary widely depending upon any number of different factors. For example, FIG. 5 shows an example of an overall network in which weighted VLAN carving may be implemented, but it should be appreciated the topology of an overall network may vary, and is not limited to having the topology shown in FIG. 5.

The embodiments may be implemented as hardware and/or software logic embodied in a tangible medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:
1. A method comprising:
  determining when a predetermined period of time has elapsed;
  determining whether at least a first message has been obtained on a first port of a node during the predetermined period of time when it is determined that the predetermined period of time has elapsed;
  identifying the first port as being connected to a single-homed site when it is determined that the at least first message has not been obtained on the first port during the predetermined period of time; and identifying the first port as being connected to one selected from a group including a multi-homed network, a multi-homed device, and a hierarchical Ethernet segment when it is determined that the at least first message has been obtained on the first port during the predetermined period of time, the hierarchical Ethernet segment including a first segment and a second segment, wherein the second segment corresponds to an access network.

2. The method of claim 1 wherein the node is a provider edge node that is associated with an Multiprotocol Label Switching (MPLS) network or an Internet Protocol (IP) network.

3. The method of claim 1 wherein the at least first message is a Bridge Protocol Data Unit (BPDU), and wherein identifying the first port as being connected to the multi-homed network includes sending a first Ethernet segment identifier (ESI) in an Ethernet segment route to advertise connectivity and obtaining at least the first ESI in the Ethernet segment route and a second ESI.

4. The method of claim 1 wherein the at least first message is a Bridge Protocol Data Unit (BPDU), and wherein identifying the first port as being connected to the multi-homed network includes sending a first Ethernet segment identifier (ESI) in an Ethernet segment route to advertise connectivity and obtaining information associated with a plurality of hierarchical relationships, wherein the plurality of hierarchical relationships are not associated with the first ESI.

5. The method of claim 1 wherein the at least first message is a Bridge Protocol Data Unit (BPDU), and wherein identifying the first port as being connected to the multi-homed network includes sending an Ethernet segment identifier (ESI) in an Ethernet segment route to advertise connectivity and one selected from a group including obtaining the ESI on a second port of the node and obtaining the ESI in an Ethernet segment route.

6. The method of claim 1 wherein the at least first message is a Bridge Protocol Data Unit (BPDU), and wherein identifying the first port as being connected to the hierarchical Ethernet segment includes sending a first Ethernet segment identifier (ESI) in an Ethernet segment route to advertise connectivity and one selected from a group including obtaining a hierarchical relationship associated with the first ESI in from a first provider edge as well as a second ESI from a second provider edge, and obtaining a hierarchical relationship associated with the first ESI in the Ethernet segment route and the second ESI on a second port of the node.

7. The method of claim 1 wherein the at least first message includes a Link Aggregation Control Protocol Data Unit (LACPDU), and wherein identifying the first port as being connected to the hierarchical Ethernet segment includes sending a first Ethernet segment identifier (ESI) in an Ethernet segment route to advertise connectivity and obtaining information associated with the first ESI and at least a second ESI.

8. The method of claim 1 wherein the at least first message includes a Link Aggregation Control Protocol Data Unit (LACPDU), and wherein identifying the first port as being connected to the hierarchical Ethernet segment includes sending a first Ethernet segment identifier (ESI) in an Ethernet segment route to advertise connectivity, obtaining information associated with hierarchical relationship involving a second ESI from a first provider edge, and obtaining information associated with the second ESI from a second provider edge.

9. The method of claim 1 wherein the at least first message includes a Link Aggregation Control Protocol Data Unit (LACPDU), and wherein identifying the first port as being connected to the multi-homed device includes sending a first Ethernet segment identifier (ESI) in an Ethernet segment route to advertise connectivity and one selected from a group including obtaining a second ESI on an Ethernet segment route, obtaining a hierarchical relationship associated with the second ESI in the Ethernet segment route, and obtaining the second ESI on a second port of the node.

10. The method of claim 1 wherein when the at least first message includes a Link Aggregation Control Protocol Data Unit (LACPDU) and a Bridge Protocol Data Unit (BPDU), identifying the first port includes identifying the first port as being connected to the hierarchical Ethernet segment when information relating to a first Ethernet segment and information relating to a second Ethernet segment are obtained by the node.

11. The method of claim 10 wherein when the information relating to the first Ethernet segment route and the information relating to the second Ethernet segment route are not obtained by the node, the method further includes:
  identifying the first port as being connected to the singled-homed site.

12. A tangible, non-transitory computer-readable medium comprising computer program code, the computer program code, when executed, configured to:
  determine when a predetermined period of time has elapsed;
  determine whether at least a first message has been obtained on a first port of a node during the predetermined period of time when it is determined that the predetermined period of time has elapsed;
  identify the first port as being connected to a single-homed site when it is determined that the at least first message has not been obtained on the first port during the predetermined period of time; and
  identify the first port as being connected to one selected from a group including a multi-homed network, a multi-homed device, and a hierarchical Ethernet segment when it is determined that the at least first message has been obtained on the first port during the predetermined period of time, the hierarchical Ethernet segment including a first segment and a second segment, wherein the second segment corresponds to an access network.

13. The tangible, non-transitory computer-readable medium of claim 12 wherein the node is a provider edge node.

14. The tangible, non-transitory computer-readable medium of claim 12 wherein the at least first message is a Bridge Protocol Data Unit (BPDU), and wherein the computer program code configured to identify the first port as being connected to the multi-homed network is further configured to send a first Ethernet segment identifier (ESI) in an Ethernet segment route to advertise connectivity and to obtain at least the first ESI in the Ethernet segment route and a second ESI.

15. The tangible, non-transitory computer-readable medium of claim 12 wherein the at least first message is a Bridge Protocol Data Unit (BPDU), and wherein the computer code configured to identify the first port as being connected to the multi-homed network is further configured to sending a first Ethernet segment identifier (ESI) in an Ethernet segment route to advertise connectivity and to obtain information associated with a plurality of hierarchical relationships, wherein the plurality of hierarchical relationships are not associated with the first ESI.

16. The tangible, non-transitory computer-readable medium of claim 12 wherein the at least first message is a Bridge Protocol Data Unit (BPDU), and wherein the computer code configured to identify the first port as being connected to the multi-homed network is further configured to send an Ethernet segment identifier (ESI) in an Ethernet segment route to advertise connectivity and configured either to obtain the ESI on a second port of the node and to obtain the ESI in an Ethernet segment route.

17. The tangible, non-transitory computer-readable medium of claim 12 wherein the at least first message is a Bridge Protocol Data Unit (BPDU), and wherein the computer code configured to identify the first port as being connected to the hierarchical Ethernet segment is further configured to send a first Ethernet segment identifier (ESI) in an Ethernet segment route to advertise connectivity and configured to perform one selected from a group including obtaining a hierarchical relationship associated with the first ESI in from a first provider edge as well as a second ESI from a second provider edge, and obtaining a hierarchical relationship associated with the first ESI in the Ethernet segment route and the second ESI on a second port of the node.

18. The tangible, non-transitory computer-readable medium of claim 12 wherein the at least first message includes a Link Aggregation Control Protocol Data Unit (LACPDU), and wherein the computer program code configured to identify the first port as being connected to a hierarchical Ethernet segment is further configured to send a first Ethernet segment identifier (ESI) in an Ethernet segment route to advertise connectivity and to obtain information associated with the first ESI and at least a second ESI.

19. The tangible, non-transitory computer-readable medium of claim 12 wherein the at least first message includes a Link Aggregation Control Protocol Data Unit (LACPDU), and wherein to computer code configured to identify the first port as being connected to the hierarchical Ethernet segment is further configured to send a first Ethernet segment identifier (ESI) in an Ethernet segment route to advertise connectivity, to obtain information associated with hierarchical relationship involving a second ESI from a first provider edge, and to obtain information associated with the second ESI from a second provider edge.

20. The tangible, non-transitory computer-readable medium of claim 12 wherein the at least first message includes a Link Aggregation Control Protocol Data Unit (LACPDU), and wherein the computer code configured to identify the first port as being connected to the multi-homed device is further configured to send a first Ethernet segment identifier (ESI) in an Ethernet segment route to advertise connectivity and to perform one selected from a group including obtaining a second ESI on an Ethernet segment route, obtaining a hierarchical relationship associated with the second ESI in the Ethernet segment route, and obtaining the second ESI on a second port of the node.

21. The tangible, non-transitory computer-readable medium of claim 20 wherein when the information relating to the first Ethernet segment route and the information relating to the second Ethernet segment route are not obtained by the node, the computer program code is further configured to:
identify the first port as being connected to the singled-homed site.

22. A network apparatus, comprising one or more processors operable to:
determine when a predetermined period of time has elapsed;
determine whether at least a first message has been obtained on a first port of a node during the predetermined period of time when it is determined that the predetermined period of time has elapsed;
identify the first port as being connected to a single-homed site when it is determined that the at least first message has not been obtained on the first port during the predetermined period of time; and
identify the first port as being connected to one selected from a group including a multi-homed network, a multi-homed device, and a hierarchical Ethernet segment when it is determined that the at least first message has been obtained on the first port during the predetermined period of time, the hierarchical Ethernet segment including a first segment and a second segment, wherein the second segment corresponds to an access network.

23. The network apparatus of claim 22 wherein the node is a provider edge node.

24. The network apparatus of claim 22 wherein the at least first message is a Bridge Protocol Data Unit (BPDU), and wherein the one or more processors operable to identify the first port as being connected to the multi-homed network are further operable to send a first Ethernet segment identifier (ESI) in an Ethernet segment route to advertise connectivity and to obtain at least the first ESI in the Ethernet segment route and a second ESI.

25. The network apparatus of claim 22 wherein the at least first message is a Bridge Protocol Data Unit (BPDU), and wherein the one or more processors operable to identify the first port as being connected to the multi-homed network are further operable to send a first Ethernet segment identifier (ESI) in an Ethernet segment route to advertise connectivity and to obtain information associated with a plurality of hierarchical relationships, wherein the plurality of hierarchical relationships are not associated with the first ESI.

26. The network apparatus of claim 22 wherein the at least first message is a Bridge Protocol Data Unit (BPDU), and wherein the one or more processors operable to identify the first port as being connected to the multi-homed network are further operable to send an Ethernet segment identifier (ESI) in an Ethernet segment route to advertise connectivity and operable either to obtain the ESI on a second port of the node and to obtain the ESI in an Ethernet segment route.

27. The network apparatus of claim 22 wherein the at least first message is a Bridge Protocol Data Unit (BPDU), and wherein the one or more processors operable to identify the first port as being connected to the hierarchical Ethernet segment are further operable to send a first Ethernet segment identifier (ESI) in an Ethernet segment route to advertise connectivity and operable to perform one selected from a group including obtaining a hierarchical relationship associated with the first ESI in from a first provider edge as well as a second ESI from a second provider edge, and obtaining a hierarchical relationship associated with the first ESI in the Ethernet segment route and the second ESI on a second port of the node.

28. An apparatus comprising:
a first port;
a processor; and
computer code embodied on tangible, non-transitory computer-readable medium and arranged to be executed by the processor, the computer code being configured to determine when a predetermined period of time has elapsed, to determine whether at least a first message has been obtained on the first port during the predetermined period of time when it is determined that the predetermined period of time has elapsed, to identify the first port as being connected to a single-homed site when it is determined that the at least first message has not been obtained on the first port during the predetermined period of time, and to identify the first port as being connected to one selected from a group including a multi-homed network, a multi-homed device, and a hierarchical Ethernet segment when it is determined that the at least first message has been obtained on the first port during the predetermined period of time, the hierarchical Ethernet segment including a first segment and a second segment, wherein the second segment corresponds to an access network.

* * * * *